United States Patent [19]
Kushige

[11] Patent Number: 5,327,461
[45] Date of Patent: Jul. 5, 1994

[54] VOICE COMMUNICATION APPARATUS USING AN VOICE OPERATED TRANSMITTER

[75] Inventor: Naohide Kushige, Hachioji, Japan

[73] Assignee: Kabushiki Kaisha Toshiba, Kawasaki, Japan

[21] Appl. No.: 984,499

[22] Filed: Dec. 2, 1992

[30] Foreign Application Priority Data

Dec. 3, 1991 [JP] Japan .................................. 3-319041

[51] Int. Cl.⁵ ............................................ H04B 14/06
[52] U.S. Cl. ......................................... 375/27; 455/79; 455/116; 455/343
[58] Field of Search .................. 375/27, 34; 455/218, 455/221, 223, 79, 38.3, 127, 343, 89, 116; 340/825.44; 379/59, 62

[56] References Cited

U.S. PATENT DOCUMENTS

| | | | |
|---|---|---|---|
| 4,751,725 | 5/1988 | Bojta et al. ............................ | 455/33 |
| 5,109,530 | 4/1992 | Stengel ................................ | 455/38.3 |
| 5,230,089 | 7/1993 | Kindinger et al. .................... | 455/79 |

*Primary Examiner*—Stephen Chin
*Assistant Examiner*—Bryan Webster
*Attorney, Agent, or Firm*—Finnegan, Henderson, Farabow, Garrett & Dunner

[57] ABSTRACT

A voice communication apparatus in which voice and voiceless parts are detected from voice signal data which is derived from analog-to-digital converted input voice signal, the voice signal data is temporarily stored in a transmitting buffer in a time series manner so that, when a voice part is detected, transmission of the voice signal data stored in the transmitting buffer is started from a voice start point of the voice part preceding a voice detection point, whereby a head part truncation, which would occur at the time of shifting from the voiceless part to the voice part can be eliminated and thus a high quality of natural speech communication can be realized.

29 Claims, 10 Drawing Sheets

VOICE COMMUNICATION APPARATUS USING AN VOICE OPERATED TRANSMITTER

BACKGROUND OF THE INVENTION

1. Field of the Invention

The present invention relates to a voice communication apparatus which is used in such a portable mobile communication system as a car radio telephone system or a cordless radio telephone system and which is based on a voice operated transmitter (VOX) for voice communication.

2. Description of the Related Art

Such a portable voice communication apparatus as a portable radio telephone set or a cordless radio telephone set usually uses a battery as its power source. In this connection, the miniaturization of such a battery has been demanded for the purpose of making smaller in the size and weight of the portable voice communication apparatus. For miniaturizing the battery, it is important not only to improve the battery itself but also to lower the overall power consumption of the portable voice communication apparatus.

As one of methods for effectively reducing the power consumption of such a portable voice communication apparatus, there has been recently considered a so-called VOX-based method in which a transmission circuit is operated only for a period of time during which an operator utters in its speech mode to transmit its voice signal while the operation of the transmission circuit is stopped for voice wait durations corresponding to operator's pauses. When this VOX is utilized, the power consumption of the transmission circuit can be reduced by an amount corresponding to the stopped operation or voice-absence periods of the circuit, when compared to a case where the transmission circuit is always activated throughout the speech mode.

However, according to the prior art apparatus, when an operator starts to input voice from voiceless state, due to the delay processing of preventing any erroneous detecting operation, the detection of the voice is delayed by several milliseconds with respect to a time point at which the voice signal is actually inputted. As a result, the prior art apparatus has been defective in that a head part of the voice data preceding a voice detection point is missing in the transmitted voice data so that the signal receiver cannot reproduce the missing head part of the voice data and thus the quality of the reproduced voice data is extremely deteriorated.

SUMMARY OF THE INVENTION

It is an object of the present invention to provide a voice communication apparatus which can eliminate missing of a head part of a voice signal when shifted from its voiceless state to a voice state.

To achieve the above object, in accordance with an aspect of the present invention, there is provided a voice communication apparatus which comprises: analog-to-digital (A-D) converting means for converting an input voice signal into a digital signal; encoding means for encoding the digital signal output from the A-D converting means; a transmitting buffer for temporarily storing voice signal data encoded by the encoding means in a time series manner; signal processing means for converting output data of the transmitting buffer with respect to its transmission rate to generate a burst signal; transmitting means for transmitting an output signal of the signal processing means over a radio link; detecting means for detecting voice and voiceless parts in the input voice signal on the basis of the output data of the A-D converting means; and transmission control means for stopping the output of the voice signal data from the transmitting buffer in response to detection of the voiceless part by the detecting means, and in response to detection of the voice part by the detecting means, for starting output of the voice signal data from the transmitting buffer in a time series manner sequentially from a voice start point of the voice part preceding a detected point of the voice part.

In accordance with another aspect of the present invention, there is provided a voice communication system using a voice communication apparatus for transmitting a voice signal over a radio link, comprising: a transmitting buffer for temporarily storing in a time series manner voice signal data obtained by encoding a digital voice signal converted from an input voice signal; detecting means for detecting voice and voiceless parts in the input voice signal on the basis of the digital voice signal converted from the input voice signal; and transmission control means, in response to detection of a voice part by the detecting means, for controlling the transmitting buffer to output the voice signal data in a time series manner sequentially from a voice start point of the voice part preceding a detected point of the voice part, in which the transmitting means is rendered inoperative after the voice presence/absence detecting means detects a voiceless part and, in response to the detection of the voice part by the detecting means, the transmitting means is rendered operative, In accordance with another aspect of the present invention, there is provided a radio telephone apparatus used in a radio communication system for transmitting a voice signal to a base station over a radio link, comprising: analog-to-digital (A-D) converting means for converting an input voice signal to a digital signal; encoding means for encoding the digital voice signal output from the A-D converting means; a transmitting buffer for temporarily storing voice signal data encoded by the encoding means in a time series manner; signal processing means for converting output data of the transmitting buffer with respect to its transmission rate to generate a burst signal; transmitting means for transmitting an output signal of the signal processing means over the radio link; detecting means for distinguishing and detecting voice and voiceless parts in the input voice signal on the basis of the output data of the A-D converting means; and transmission control means for stopping output of the voice signal data from the transmitting buffer in response to detection of the voiceless part detected by the detecting means and, in response to detection of the voice part by the detecting means, for starting output of the voice signal data from the transmitting buffer in a time series manner sequentially from a voice start point of the voice part preceding a detected point of the voice part.

DESCRIPTION OF THE PREFERRED EMBODIMENTS

Figure 1:
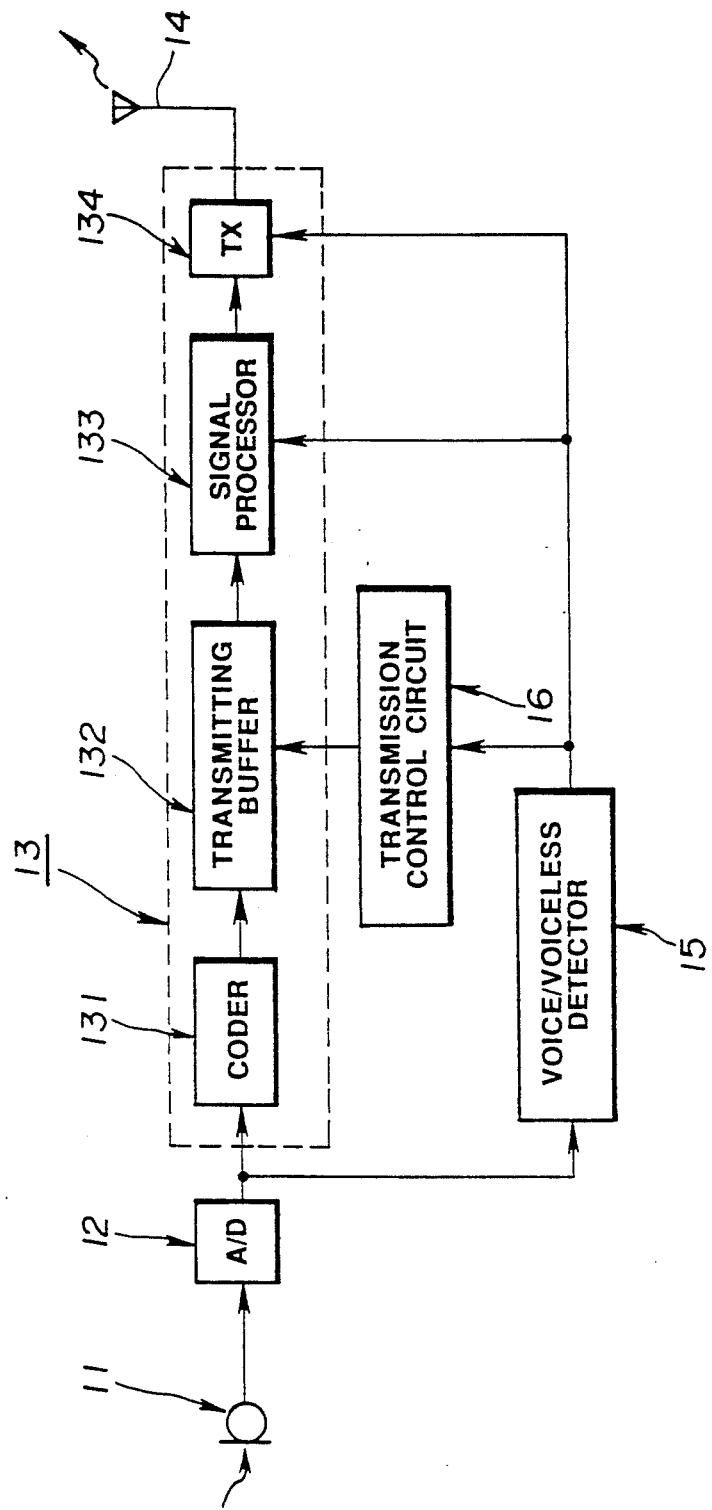
FIG. 1 is a block diagram of an arrangement of a signal transmission side of a voice communication apparatus in accordance with an embodiment of the present invention.
Figure 2:
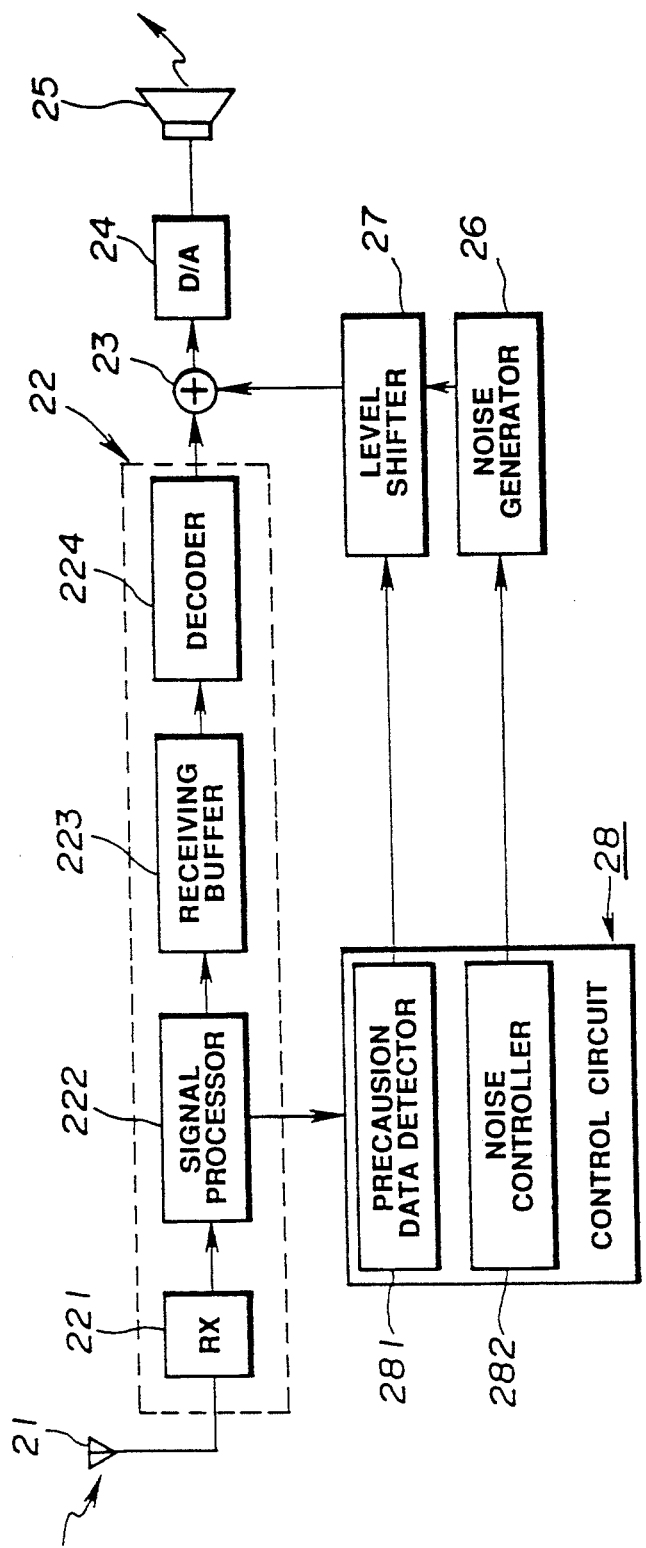
FIG. 2 is a block diagram of an arrangement of a signal reception side of the voice communication apparatus of the embodiment.

An embodiment of the present invention will be detailed below by referring to the attached drawings. Referring first to FIGS. 1 and 2, there are shown circuit diagrams of arrangements of signal transmission and reception sides of a voice communication apparatus used in a voice communication system in accordance with an embodiment of the present invention, respectively.

The signal transmission side of FIG. 1 includes, as its major components, a microphone 11 through which a voice signal is input, an analog-to-digital (A-D) converter 12 for converting the voice signal received from the microphone 11 into a digital signal, a radio transmission section 13, an antenna 14, a voice/voiceless detector 15 for detecting the presence or absence of a voice part in an input voice signal received from the A-D converter 12, and a transmission control circuit 16 for performing control over the voice data output of a transmitting buffer 132 on the basis of the output of the detector 15. More specifically, the radio transmission section 13 comprises a digital encoding circuit (CODER) 131, the aforementioned transmitting buffer 132, a signal processor 133, and a transmission circuit (TX) 134. In the signal transmission side, the transmission circuit 134 is arranged so that, when the input voice signal is in its voice absence duration, the transmission circuit performs its VOX operation on the basis of the output of the detector 15, whereby the operation of the transmission circuit is turned off.

The signal reception side of FIG. 2 includes, as its major components, an antenna 21; a radio reception section 22 having a reception circuit (RX) 221, a signal processor 222, a receiving buffer 223, and a digital decoding circuit (DECODER) 224; a control circuit 28 having at least a precaution data detector 281 and a noise controller 282; a noise generation circuit 26 for generating a pseudo noise under control of the noise controller 282 when the transmission circuit 134 in the radio transmission section 13 of the aforementioned signal transmission side is turned off, that is, when the VOX function is turned on; a level shifter 27 for changing the level of the pseudo noise; an adder 23 for adding together an output of the decoder 224 and an output of the level shifter 27; a digital-to-analog (D - A) converter 24 for converting an output of the adder 23 into an analog signal, and a loudspeaker 25 to which an output of the D-A converter 24 is applied.

Explanation will then be made as to the brief operation of the signal transmission and reception sides of the voice communication apparatus of the present invention. In the signal transmission side of FIG. 1, first, a voice uttered from a sender is converted into a voice signal through the microphone 11, digitalized at the A-D converter 12, and then sent to the radio transmission section 13 and the detector 15.

As already explained above, the radio transmission section 13 comprises the digital encoding circuit (CODER) 131, the transmitting buffer 132, a signal processor 133, and the transmission circuit (TX) 134.

The coder 131 compresses and encodes a digital voice signal received from the A-D converter 12 on a coding basis, e.g., on an adaptive differential pulse code modulation (ADPCM) basis and sends it to the transmitting buffer 132.

The transmitting buffer 132 temporarily stores a signal compressed and encoded at the coder 131 to sequentially update it to a new signal. The signal processor 133 converts voice data received from the transmitting buffer 132 with respect to a transmission rate and generates a burst signal.

Next, the transmission circuit 134 modulates a carrier wave by voice data output from the signal processor 133 to obtain a radio carrier signal and transmits the radio carrier signal from the antenna 14 to a radio link.

The digital voice signal issued from the A-D converter 12 is also applied to the detector 15. The detector 15 monitors the level of the received digital voice signal to judge the presence or absence of a voice part in the digital voice signal and detects the starting and ending points (voice start point and voice end point) of the voice part in the digital voice signal.

And the detector 15 controls the transmission circuit 134 to cause the supply of power to the transmission circuit 134 to be stopped for a period of time between the detection of the voice end point and the detection of the next voice start point, whereby the operation of the transmission circuit 134 is stopped. When detecting the voice start point of the voice part, the detector 15 generates transmission start data at that detection time and sends it to the transmission circuit 134 for transmission thereof to the radio link. When detecting the end point of the voice part, the detector 15 Generates transmission stop precaution data and sends it to the transmission circuit 134 for transmission thereof to the radio link. The detection of the start and end points of voice parts in the digital voice signal can be realized, for example, by a voice detection method used in voice recognition and composition techniques.

The transmission control circuit 16 performs control over the data output of the transmitting buffer 132 therefrom to the signal processor 133 on the basis of the start or end point detection signal received from the detector 15.

In the signal reception side of FIG. 2, on the other hand, the radio carrier signal transmitted from the transmission side of the speech sender is received at the antenna 21 and then applied to the radio reception section 22. As already explained above, the radio reception section 22 comprises the reception circuit (RX) 221, the signal processor 222, the receiving buffer 223, and the digital decoding circuit (DECODER) 224.

The reception circuit (RX) 221 converts with respect to frequency the received radio carrier signal into a decodable intermediate frequency signal. The intermediate frequency signal contains voice and control data of the received signal. The signal processor 222 separates the received signal data into the voice and control data and sends the separated control data to the control circuit 28 while sends the separated voice data to the digital decoding circuit 224 through the receiving buffer 223.

Also incorporated in the radio reception section 22 is a received-field intensity detector, which comprises a carrier squelch circuit or the like and which sends carrier data detected therein to the control circuit 28.

The digital decoding circuit 224 applies predetermined digital decoding operation to the aforementioned voice data received from the signal processor 222 via the receiving buffer 223 to reproduce it into a digital voice signal. The digital voice signal is applied from the decoder 224 to the D-A converter 24 through the adder 23 (which will be explained later), converted at the D-A converter 24 into an analog signal, and then output from the loudspeaker 25.

The signal reception side of the voice communication apparatus of the present invention also includes the noise generation circuit 26 and the level shifter 27. The noise generation circuit 26, which, for example, comprises an M-series random generator, generates random noise according to an instruction of the control circuit 28 (which will be explained later). The random noise, which is similar to ambient noise occurred during speech communication, is used as pseudo background noise.

The level shifter 27 performs its arithmetic operation under control of the control circuit 28 to variably control the level of the random noise signal generated at the noise generation circuit 26, and sends it to the adder 23.

The adder 23 adds the random noise signal received from the level shifter 27 to the digital voice signal received from the digital decoding circuit 224 and outputs an addition output.

In the signal reception side of the voice communication apparatus of the present invention, the control circuit 28, which comprises, e.g., a microcomputer as its main controller, includes the precaution data detector 281 and the noise controller 282, in addition to such ordinary exclusive functions as a controller associated with the selection and setting of the radio link and an interconnection controller associated with the signal transmission and reception, and termination of speech communication, etc.

The precaution data detecting means 281 detects transmission start data and transmission stop precaution data from the control data received from the radio reception section 22.

The noise control means 282, on the basis of a detection result of the precaution data detecting means 281, detects a voice part and a voiceless part in the received voice signal. And, in the voiceless part including both a predetermined period immediately before the end of the voice part and a predetermined period immediately after the start of the voice part, the noise controller 282 causes the noise generation circuit 26 to generate the random noise and also controls the level shifter 27 to change the level of the random noise.

The brief operation of the signal transmission and reception sides of the voice communication apparatus in accordance with the present invention has been explained above. The transmitting operation of the signal transmission side will then be further detailed.

Figure 3:
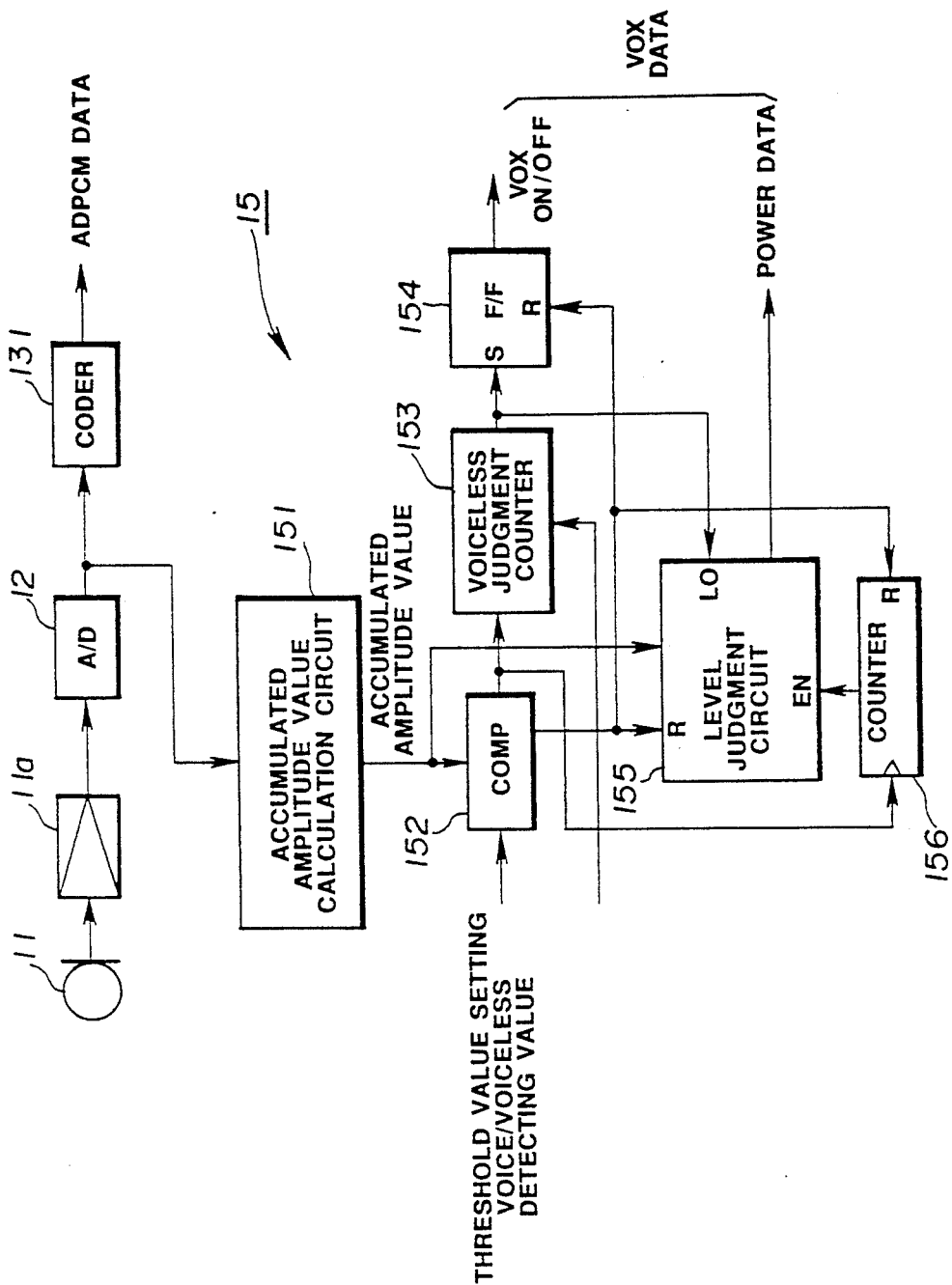
FIG. 3 is a block diagram of a detailed structure of a voice/voiceless detector in the signal transmission side of FIG. 1.

Shown in FIG. 3 is a detailed arrangement of the voice/voiceless detector 15 in the signal transmission apparatus of the present invention shown in FIG. 1. For convenience of explanation of the voice/voiceless detector 15, the microphone 11, an amplifier 11a, the A-D converter 12 and the digital encoding circuit 131 are also shown in FIG. 3 as its peripheral circuits.

In the present example, it is assumed that the voice presence/absence detector 15 is arranged so that, when the input level is lower than a predetermined threshold value for judgment of presence or absence of a voice part through, e.g., continual 100 frames, the detector judges it as a voiceless part and turns off the transmission circuit 134 to turn on the VOX function.

In operation of the circuit of FIG. 3, a voice signal received from the microphone 11 is amplified at the amplifier 11a, converted at the A-D converter 12 into a digital signal, and then applied to the digital encoding circuit 131 and also to an accumulated amplitude value calculation circuit 151. The digital encoding circuit 131 converts the above digital signal into ADPCM data and supplies it to the transmitting buffer 132.

Meanwhile, the accumulated amplitude value calculation circuit 151 alters the digital voice signal received from the A-D converter 12 in a serial format into a parallel format, and accumulates the amplitude values of the parallel-formatted signal by an amount corresponding, for example, to its one frame and add the accumulated amplitude value to a comparison circuit 152 and also to a level judgment circuit 155.

The comparison circuit 152, in which a predetermined threshold value for judgment of presence or absence of a voice part is previously set, acts to compare the threshold value with the accumulated amplitude value received from the accumulated amplitude value calculation circuit 151.

In the comparison, when the accumulated amplitude value is larder than the threshold value, the comparison circuit 152 judges that the voice is present and outputs a reset signal to reset terminals R of a level judgment circuit 155 and a flip-flop 154, whereby the level judgment circuit 155 and the flip-flop 154 are reset. In this case, since the VOX function is turned off, the ADPCM data issued from the digital encoding circuit 131 is transmitted to the signal receiving side terminal through the transmitting buffer 132, signal processor 133, transmission circuit 134 and antenna 14 in FIG. 1.

When the accumulated amplitude value is smaller than the threshold value, on the other hand, the comparison circuit 152 judges that the voice is absent and outputs a count signal to a voiceless judgment counter 153 and also to a counter 156. Previously set in the counter 156 is a value corresponding to the measurement start timing of power data, e.g., corresponding to a frame number 70. Thus, when the count value of an output signal of the counter 156 reaches the set value corresponding to the measurement start timing of the power data, the counter 156 outputs an enable signal to an enable terminal EN of the level judgment circuit 155 to cause the level judgment circuit 155 to start its measuring operation of the power data.

The level judgment circuit 155, when receiving the enable signal at its enable terminal EN, measures the power data on the basis of the accumulated amplitude value received from the accumulated amplitude value calculation circuit 151, until the counted value of the counter 156 reaches a predetermined value, e.g., a value corresponding to a frame number 100, and outputs its measurement result as the power data.

Meanwhile, the voiceless judgment counter 153 counts the count signal received from the comparison circuit 152, and when the counted value of the counter 153 reaches a predetermined value, e.g., a value corresponding to a frame number 100, the counter 153 outputs a set signal to a set terminal S of the flip-flop 154, thereby setting the flip-flop 154.

This results in that the VOX function is turned on and the transmission circuit 134 of FIG. 1 is turned off, thereby stopping the transmission of the ADPCM data as the output of the digital encoding circuit 131. When the comparison circuit 152 judges the presence of a voice part resulting from the fact that the accumulated amplitude value becomes larger than the threshold value before the counted value of the counter 153 reaches the predetermined value, e,g., a value corresponding to a frame number 100; the flip-flop 154 is not set and thus the VOX function is not turned on. In this case, the level judgment circuit 155 is reset by the output of the comparison circuit 152 so that the Dower data is not output.

Figure 4:
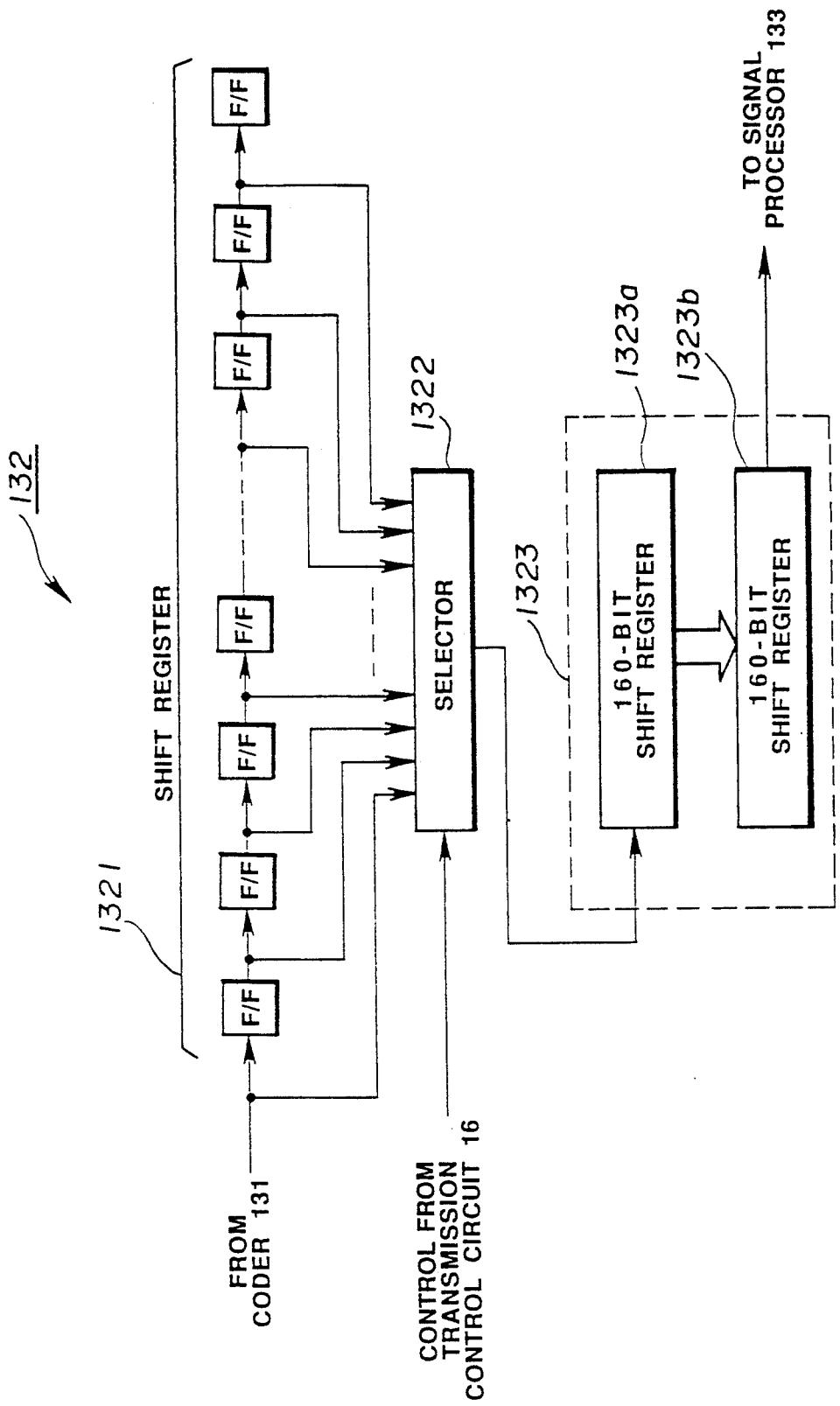
FIG. 4 is a block diagram of a detailed structure of a transmitting buffer in the signal transmission side of FIG. 1.

Referring next to FIG. 4, there is shown an example of the transmitting buffer 132 in the signal transmission side of the voice communication apparatus of FIG. 1. As illustrated in the drawing, the transmitting buffer 132 comprises a shift register 1321 for prevention of head-part missing, a selector 1322 for switching between outputs of the shift register 1321, and a speed conversion buffer 1323 for converting an output of the selector 1322 into a high-speed signal. In this connection, the speed conversion buffer 1323 may be provided not in the transmitting buffer 132 but in the signal processor 133 at the latter stage.

In the transmitting buffer 132, the digital voice signal received from the digital encoding circuit 131 is applied to the shift register 1321 for prevention of head-part missing.

The shift register 1321, which comprises a plurality of stapes of flip-flops, functions to sequentially shift the input signal received from the coder 131 in synchronism with a sampling clock of the A-D converter 12, sequentially hold the signal at the respective flip-flops, and outputs the sequential signal to the selector 1322 simultaneously with the shifting operation.

In the illustrated example, the shift register 1321 comprises such a device which performs FIFO operation over the digital voice signal received from the digital coder circuit 131.

More in detail, the shift register 1321 has such a function that, when a first-stage of the flip-flogs in the receives latest voice data from the digital encoding circuit 131, the first-stage flip-flop shifts the past data sequentially to the subsequent flip-flops on a stage-by-stage basis, which results in that the last-stage flip-flop outputs the oldest data, whereby the data, which becomes old within the storage capacity of the shift register, is sequentially discarded and the latest data is sequentially held.

For example, in such a system that a transmission frame is fixed to be 5 msec and data of 160 bits is set to be transmitted in the frame, the shift register 1321 is required to have an overall data storage capacity of being able to storing voice data corresponding to 160 bits to be transmitted in the 5 msec time period.

With the signal transmission side having such an arrangement as mentioned above, the latest data held in the shift register 1321 and corresponding to, e.g., 160 bits are voice data already sampled. Accordingly, when the outputs of the flip-flops of the shift register 1321 are suitably switched therebetween by the selector 1322, there can be realized such control that these sampled voice data are started to be output from proper timing retroactive to the past (up to one frame when the transmission frame interval is fixed).

In the present invention based on this idea, when the voice/voiceless detector 15 detects the output start point of a voice part in the above voice data, the switching operation of the selector 1322 is controlled so that the transmission of the voice data is started from a point earlier than the voice detection point.

The switching control of the selector 1322 is realized the transmission control circuit 16. More specifically, the transmission control circuit 16, on the basis of the voice/voiceless detection result (output of the flip-flop 154) of the detector 15 in FIG. 3, finds a point (real voice start point preceding the voice detection point) where no head-part truncation occurs, and determines the found point as the transmission start point of the voice data. Thereafter, the transmission control circuit 16 switchingly controls the selector 1322 in such a manner that the transmission of the voice data is started from one of the flip-flops of the shift register 1321 corresponding to the voice start point.

The voice data output from the shift register 1321 subjected at the selector 1322 to the switching control is applied to the speed conversion buffer 1323 where the vòice data signal is subjected at 160-bit shift registers 1323a and 1323b to a predetermined speed conversion and then sent to the signal processor 133.

As a result of the switching control of the selector under control of the transmission control circuit 16, when detecting a voice part in the digital voice signal, the signal transmission side of the voice communication apparatus of the invention performs such transmitting operation that transmission is started from the voice part including a part preceding the voice detection point.

Figure 8:
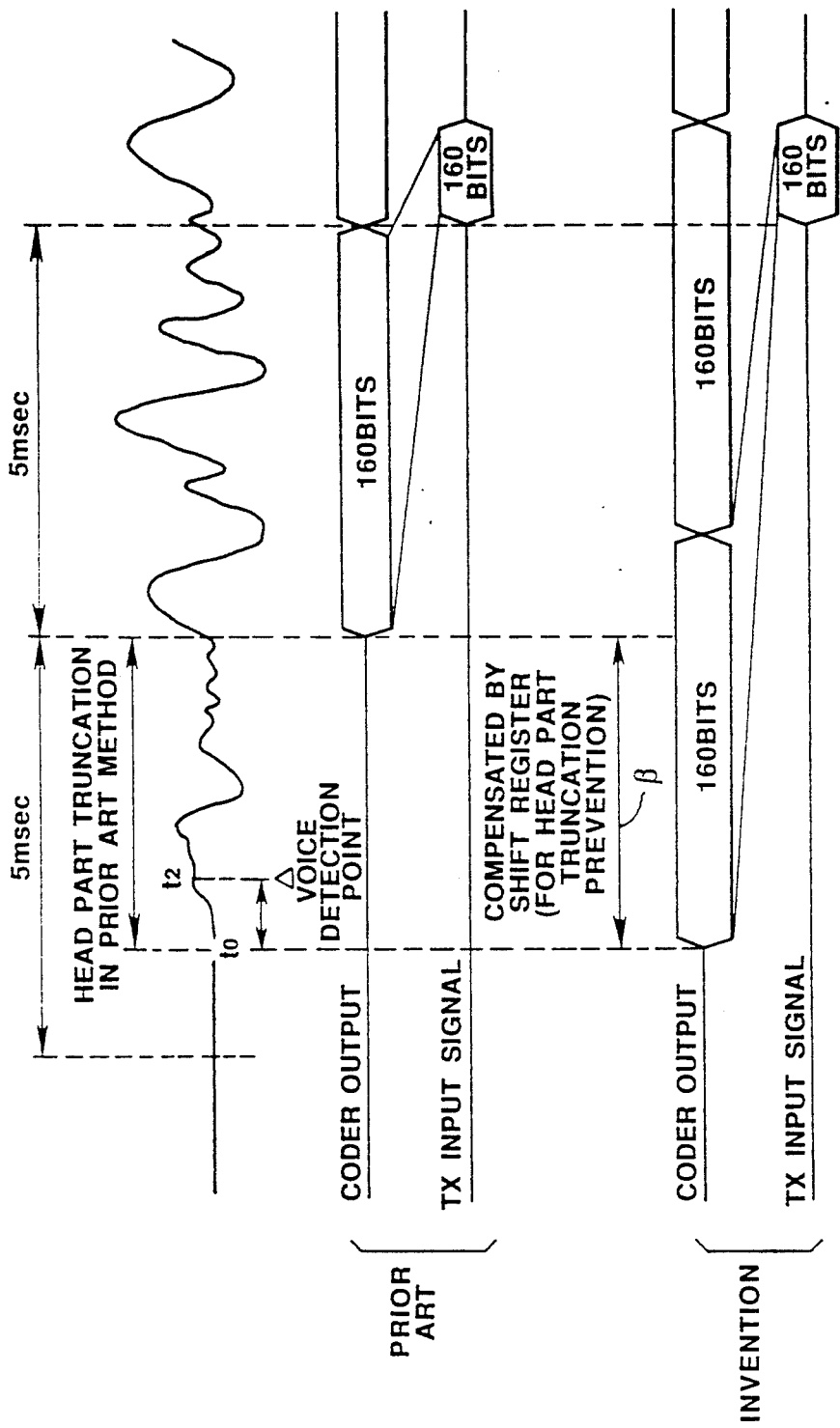
FIG. 8 is a timing chart of waveforms of signals appearing at various points in the voice communication apparatus of the present invention and a prior art system in their transmission modes.

The featured transmission control operation of the transmitter apparatus of the present invention will be verified by comparing with the transmitting operation of this type of prior art apparatus, with reference to a timing chart of FIG. 8.

In the prior art apparatus, when the voice/voiceless detector 15 detects a voice part in the voice data, the transmition of the voice data is started from the voice detection point (point t2 in FIG. 8) but the prior art apparatus has no function of holding the voice data including the part preceding the voice detection point t2. Thus, the prior art apparatus must wait for the start of the transmission of the voice data until the start point of the next transmission frame, which results in that there occurs a head part truncation corresponding to up to one frame of the voice data.

In accordance with the system having the transmission buffer 132 with the configuration as shown in FIG. 4 of the present invention, on the other hand, the transmission control circuit 16 finds a point (t0 in FIG. 8) where no head part truncation occurs on the basis of the voice detection point t2, and determines the point t0 as the transmission start point of the voice data.

In this connection, the point t0 can be determined in each system according to the voice detection method. For example, in such a system that the presence of a voice part is determined when the level of a threshold value for judgment of presence or absence of a voice part exceeds for 10 msec or more, a time point 10 msec preceding the voice detection point t2 can be specified as the point t0.

Under such conditions, the transmission control circuit 16 controls the switching operation of the selector 1322 in such a manner that the transmission of the voice data is started with a part of the voice data held in the shift register 1321 of head-part truncation prevention of the transmitting buffer 132 corresponding to the point t0 and the shift register 1321 delays the voice data by an amount corresponding to a range $\beta$ in FIG. 8 and transmits it, whereby head part truncation is reliably avoided.

According to the above control, the transmission data is delayed by the range $\beta$ in FIG. 8 but the transmission data contains the voice data including the part preceding the voice detection point t2, whereby the head part truncation can be completely prevented.

Figure 9:
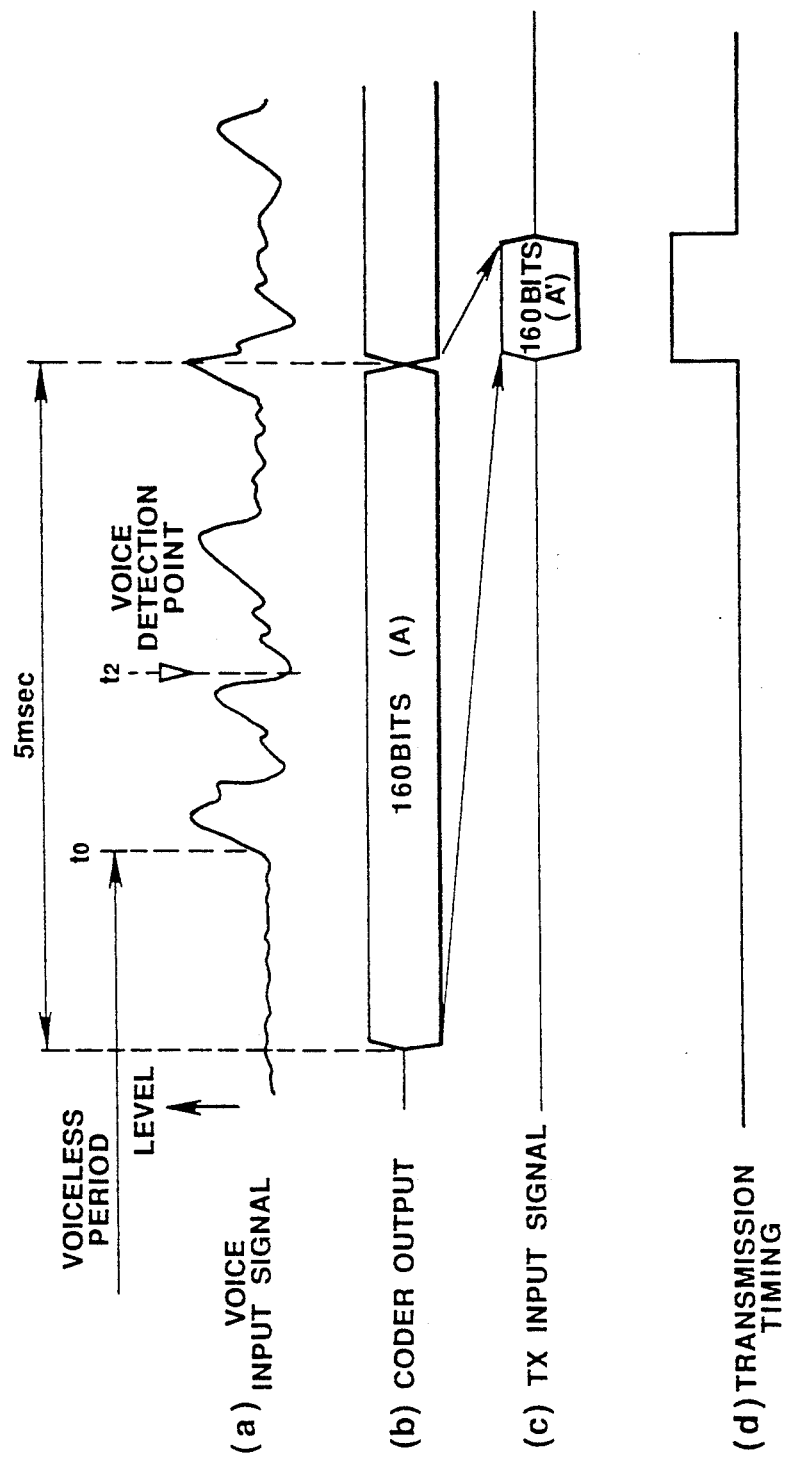
FIG. 9 is a timing chart of waveforms of signals appearing at various points in the transmission mode in the voice communication apparatus in accordance with another embodiment of the present invention.

Next, an explanation will be given to the flow of the transmission operations in another embodiment of the present invention by referring to FIG. 9. In this embodiment, a transmission buffer of a type different from the transmission buffer 132 shown in FIG. 4 is used as the transmission buffer of the transmission side (refer to FIG. 1). FIG. 9 shows a timing chart of waveforms of various signals during a period from a state where the signal transmission side waits for utterance of an operator and the supply of power to the transmission circuit 134 is stopped to a state where the operator's utterance causes the start of operation of the transmission circuit 134 and a voice signal is transmitted.

First, even during the voiceless period (waiting period for operator's utterance), the digital encoding circuit 131 is continuously operated so that a voice signal (refer to FIG. 9(a)) received from the microphone 11 is encoded at the coder 131 into encoded data (refer to FIG. 9(b)) and then sequentially sent to the transmitting buffer 132.

The transmitting buffer 132 sequentially stores new data received from the digital encoding circuit 131 on such an FIFO basis as already explained earlier and sequentially erases the old data, whereby a predetermined amount of voice data is held in the transmitting buffer. Thereafter, when a voice period (operator's utterance) comes and the detector 15 judges it as the presence of a voice part, the transmitting buffer 132 stops its updating operation of the data and immediately sends the data so far held therein to the signal processor 133 according to an instruction from the transmission control circuit 16 (which period is shown by A in FIG. 9(b)). Simultaneously with it, the transmission control circuit 16 supplies power to the transmission circuit 134 to put the circuit 134 in its transmission mode.

The voice data entered in the signal processor 133 is converted into a high-speed burst signal (shown by A' in FIG. 9(c)), sent to the transmission circuit 134, and then transmitted from the antenna 14 toward a party side terminal (refer to FIG. 9(d)).

Meanwhile, in the party side terminal (refer to the arrangement of FIG. 2), the voice data signal received at the antenna 21 is sent to the radio reception section 22, where the voice data signal is demodulated according to a procedure opposite to that of the transmission side terminal, converted into a voice signal and then issued from the loudspeaker 25.

Thereafter, voice burst signals converted at the signal transmission side terminal are similarly sequentially transmitted to the party side terminal where the aforementioned reproducing operation is repeatedly carried out over the voice signals.

In accordance with the present invention, in this way, when a shift is made from a voiceless period (operator's pause duration) to a voice period (operator's utterance duration), the voice data can be transmitted to the party side starting from a time point of the voice signal preceding the voice detection point, whereby head part truncation of the input voice signal can be effectively prevented. This means that, when viewed from the signal reception side, the voice signal can be reproduced with its head part compensated for based on the signal received from the signal transmission side according to the aforementioned procedure, whereby a speech quality can be remarkably improved.

Meanwhile, in this type of prior art voice communication apparatus, the presence of a voice part is judged when the level of the input voice signal exceeds the preset threshold level as mentioned above. As a result, in the prior art apparatus in which the transmission of the voice data is started from the voice detection point, the head part truncation can be effectively prevented by minimizing as much as possible a time for judging the appearance of the voice part.

However, the shorter the time for judging the presence of the voice is, the more often the erroneous operation due to ambient noise occurs and the weaker the VOX effect becomes. Due to such restrictions, the prior art apparatus has been disadvantageous in that it is indispensable to set a certain length of time for judgment of the presence of a voice part, which results in that the prolonged set time disables the effective reduction of the head part truncation.

In order to eliminate the above disadvantage in the prior art, in accordance with the present invention, since the voice data are previously stored in the transmitting buffer 132 and transmission of the voice data to the party side is started from the data preceding the voice detection point at the time of a shift from a voiceless part to a voice part, a time taken until judgment of voice part presence can have relatively enough allowance.

This means, when explained in connection with, e.g., FIG. 8, that a time difference between the voice detection point t2 and the voice start point t0 can be set to be large. In this way, since the voice detection time can be set to have enough allowance, this contributes to prevention of the above erroneous operation at the time of voice detection and to realization of high VOX effect. Further, this also contributes to the fact that the voice detection time can be set to be long, the ON duration of the VOX effect can be made long, and power saving can be achieved.

In the above signal receiving operation of the party side terminal, the noise controller 282 of the control circuit 28 distinguishes the voice part from the voiceless part in the received voice signal on the basis of the detection result of the precaution data detecting means 281 and causes the noise generation circuit 26 to generate random noise in a voiceless duration containing both a predetermined period immediately before the end of the voice part and a predetermined period immediately after the start of the voice part and, at the same time, controls the level shifter 27 to change the level of the random noise.

Figure 5:
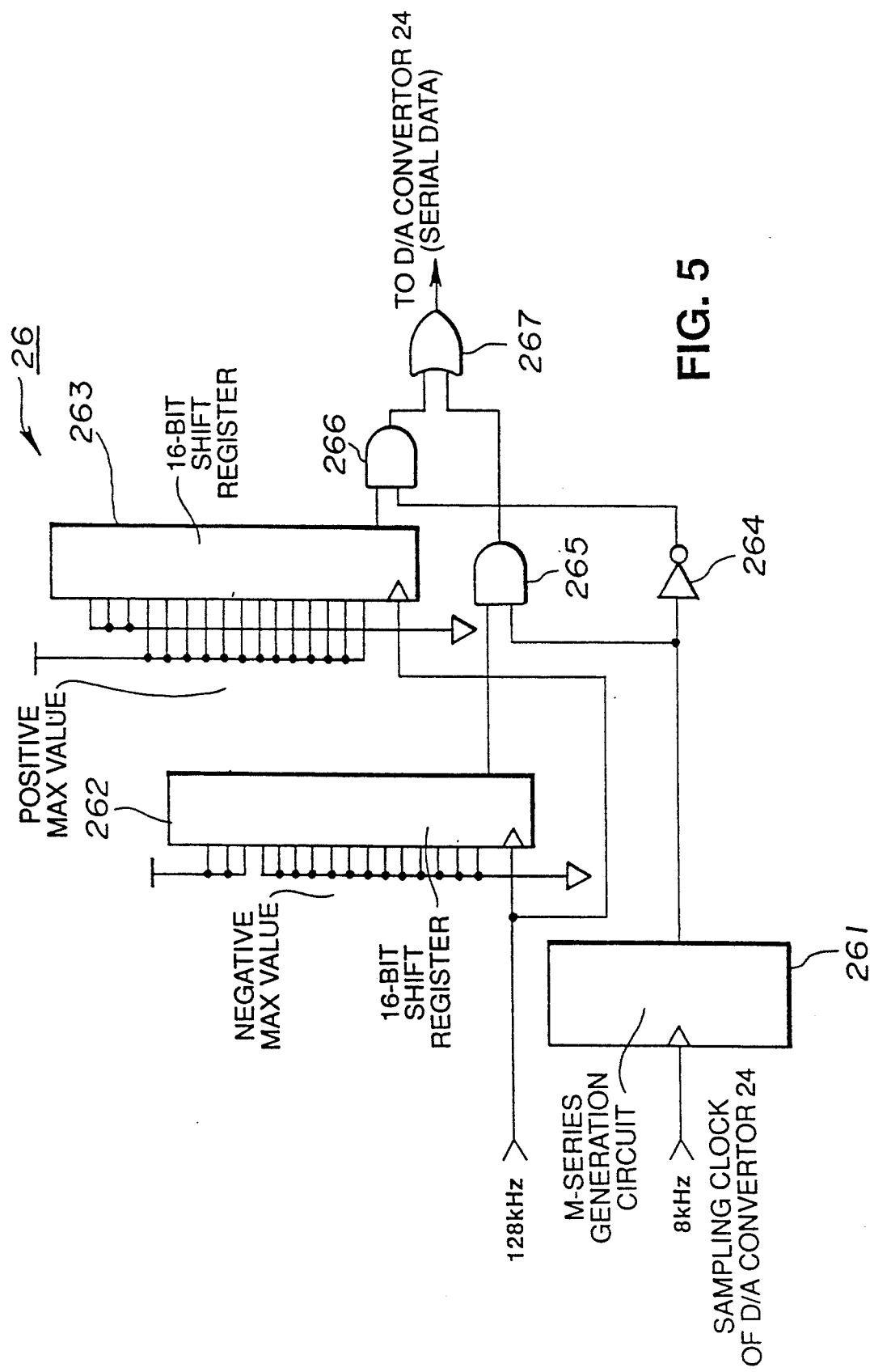
FIG. 5 is a block diagram of a detailed structure of a noise generation circuit in the signal reception side of FIG. 2.
Figure 6:
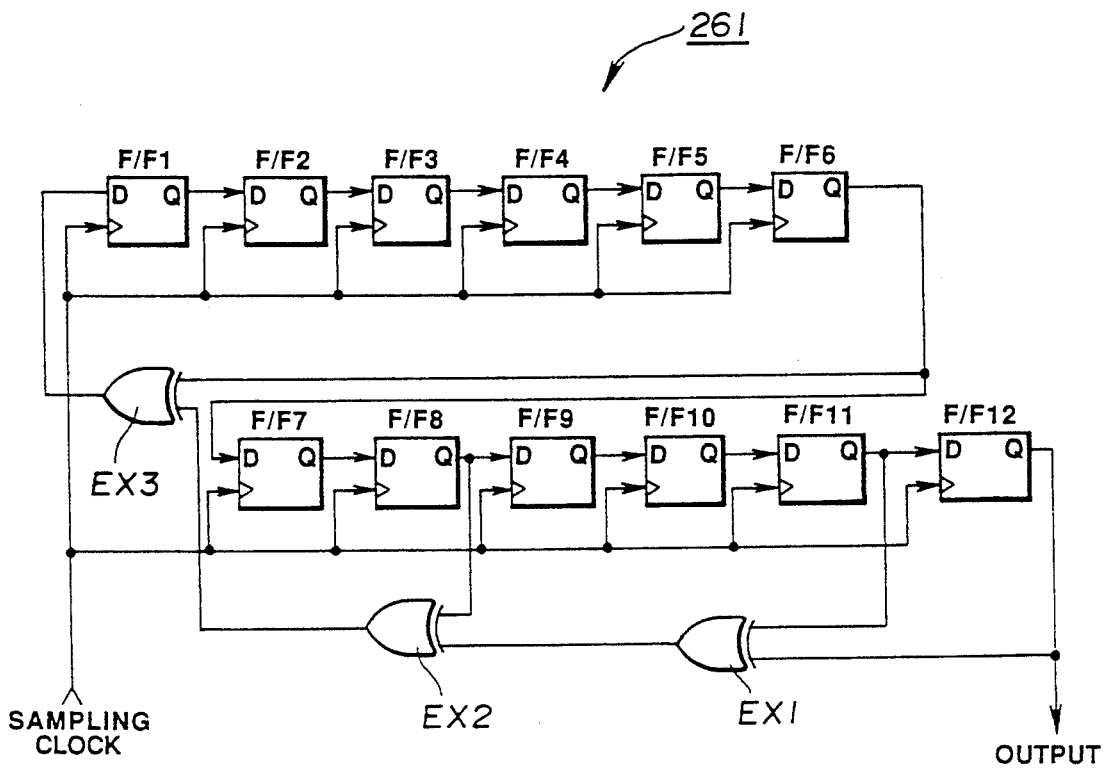
FIG. 6 is a block diagram of a detailed structure of an M-series generation circuit in the noise generation circuit of FIG. 5.
Figure 7:
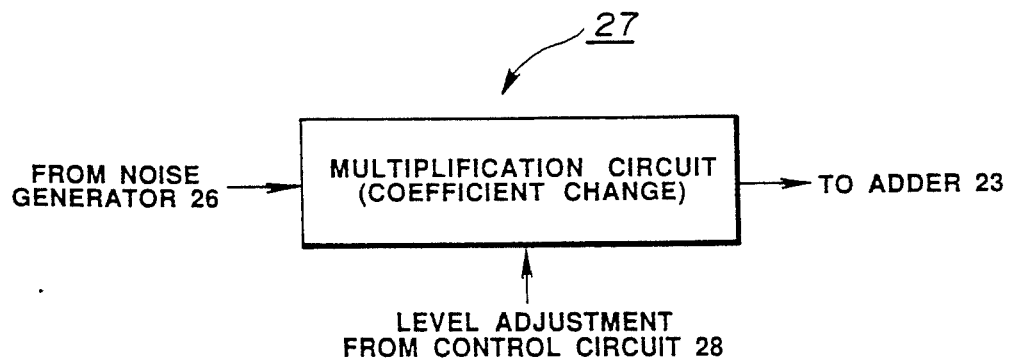
FIG. 7 shows a conceptional configuration of a level shifter in the signal reception side of FIG. 2.

Detailed explanation will then be made as to the generating operation of the random noise of the present invention apparatus when the VOX function is in its ON state, by referring to FIGS. 5 to 7. Referring first to FIG. 5, there is shown a detailed structure of the noise generation circuit 26 in the signal reception side of FIG. 2. The illustrated noise generation circuit 26 is arranged so that an M-series generation circuit 261 is basically used to generate a pseudo noise.

More in detail, the noise generation circuit 26 shown in FIG. 5 includes a 16-bit shift register 263 to which positive maximum values are applied, a 16-bit shift register 262 to which negative maximum values are applied, and the aforementioned M-series generation circuit 261. Switching between an output of the 16-bit shift register 263 having the positive maximum values received therein and an output of the 16-bit shift register 262 having the negative maximum values received therein is carried out through a logic circuit which comprises AND Dates 265 and 266, an OR gate 267 and an inverter 264 according to an output of the M- series generation circuit 261 to output either one of these outputs of the registers 263 and 262 to the D-A converter A 128 kHz clock signal, which is applied to the 16-bit shift registers 263 and 262 having the positive and negative maximum values received therein respectively, is used to output serial signals from the respective 16-bit shift registers 263 and 262. Meanwhile, an 8 kHz sampling clock signal, which is applied from the D-A converter 24 to the M-series generation circuit 261, is used to generate a sampling clock (data extraction clock) for the M-series generation circuit 261.

Shown in FIG. 6 is a detailed structure of the M-series generation circuit 261 in FIG. 5. The illustrated M-series generation circuit 261 comprises a 12-stage shift register made up of flip-flops F/F1 to F/F12, an exclusive "OR" logical operation circuit EX1 for performing logical exclusive "OR" operation of an output of the eleventh stage (flip-flop F/F 11) of the shift register and an output of the twelfth stage (flip-flop F/F 12) thereof, an exclusive "OR" logical operation circuit EX2 for performing logical exclusive "OR" operation of an output of the exclusive "OR" logical operation circuit EX1 and an output of the eighth stage (flip-flop F/F 8) of the shift register, and an exclusive "OR" logical operation circuit EX3 for performing logical exclusive "OR" operation of an output of the exclusive "OR" logical operation circuit EX2 and an output of the sixth stage (flip-flop F/F 6) of the shift register.

And an output of the exclusive "OR" logical operation circuit EX3 is fed back to an input of the first stage of the shift register (that is, to an input D of the flip-flop F/F 1) to generate an output signal at the output of the flip-flop F/F 12.

Applied to respective clock inputs of the flip- flops F/F 1 to F/F 12 is a sampling clock which corresponds to the 8 kHz clock signal received from the D-A converter 24.

With the arrangement of the signal reception side shown in FIG. 2, the random noise generated by the aforementioned noise generation circuit 26 is applied to the level shifter 27. As shown in FIG. 7, the level shifter 27 changes the random noise received from the noise generation circuit 26 on the basis of a level adjustment signal received from the control circuit 28 and outputs a level-adjusted signal to the adder 23. The adder 23 adds the level-adjusted signal to the output of the digital decoding circuit 224 and outputs an addition signal to the D-A converter 24. As a result, the signal reception side can reproduce a received voice corresponding to the above random noise and thus can maintain natural speech communication.

Explanation will next be made as to a radio telephone apparatus employing the aforementioned voice communication system in accordance with the present invention, by referring to FIGS. 10 and 11. More specifically, FIG. 10 shows an arrangement of the entire radio telephone apparatus of the present invention, and FIG. 11 is a timing chart of waveforms of signals appearing in various points of the radio telephone apparatus for explaining the transmitting and receiving operation of the system.

Figure 10:
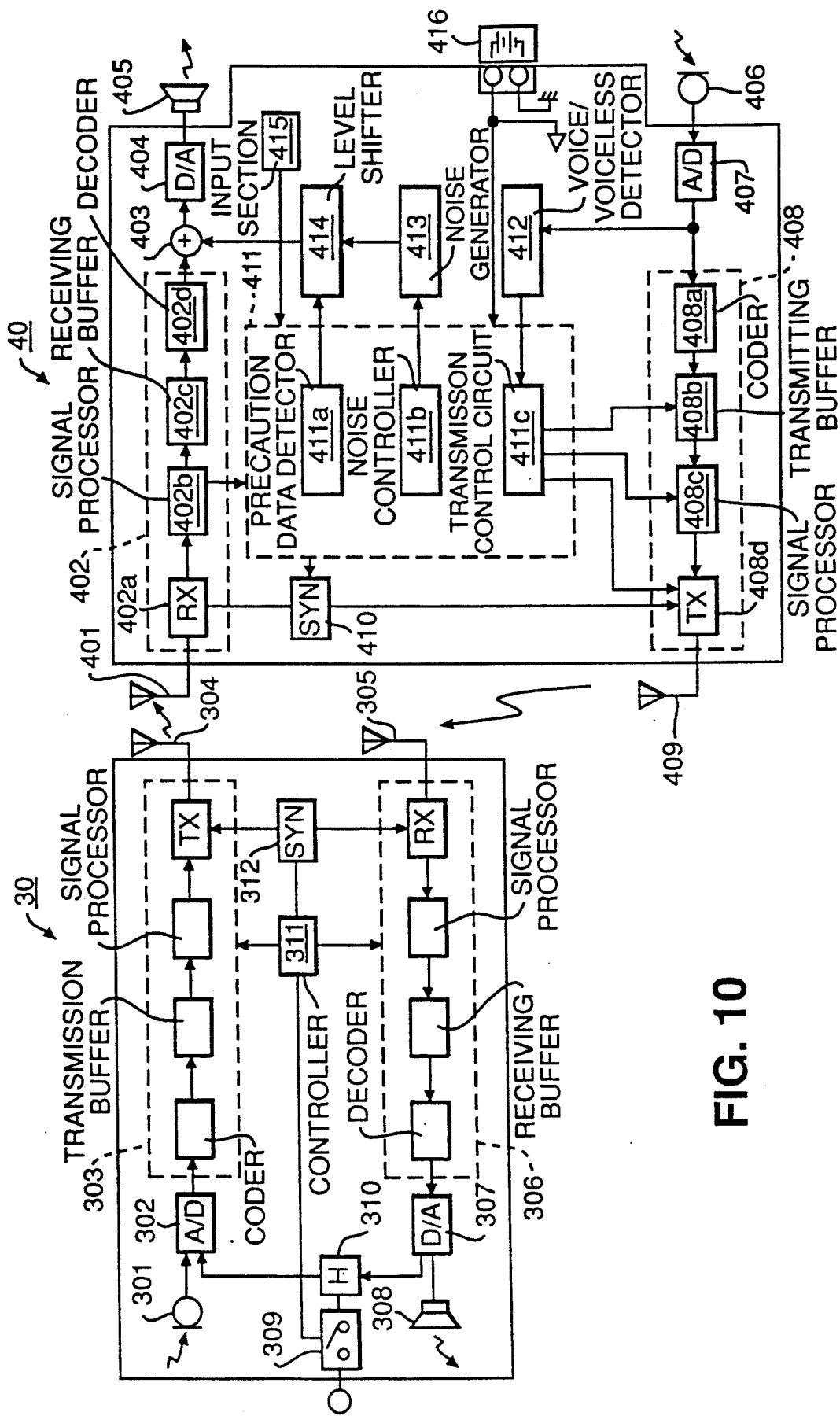
FIG. 10 is an arrangement of a radio telephone apparatus using the voice communication apparatus of the invention in accordance with an embodiment of the present invention.

In the apparatus of FIG. 10, a base station 30 has standard functions which are common in this sort of apparatus, while a mobile station 40, which is located as opposed to the base station 30 via a radio link, has such a circuit configuration that corresponds to an integration of the signal transmission side of FIG. 1 and the signal reception side of FIG. 2.

Figure 11:
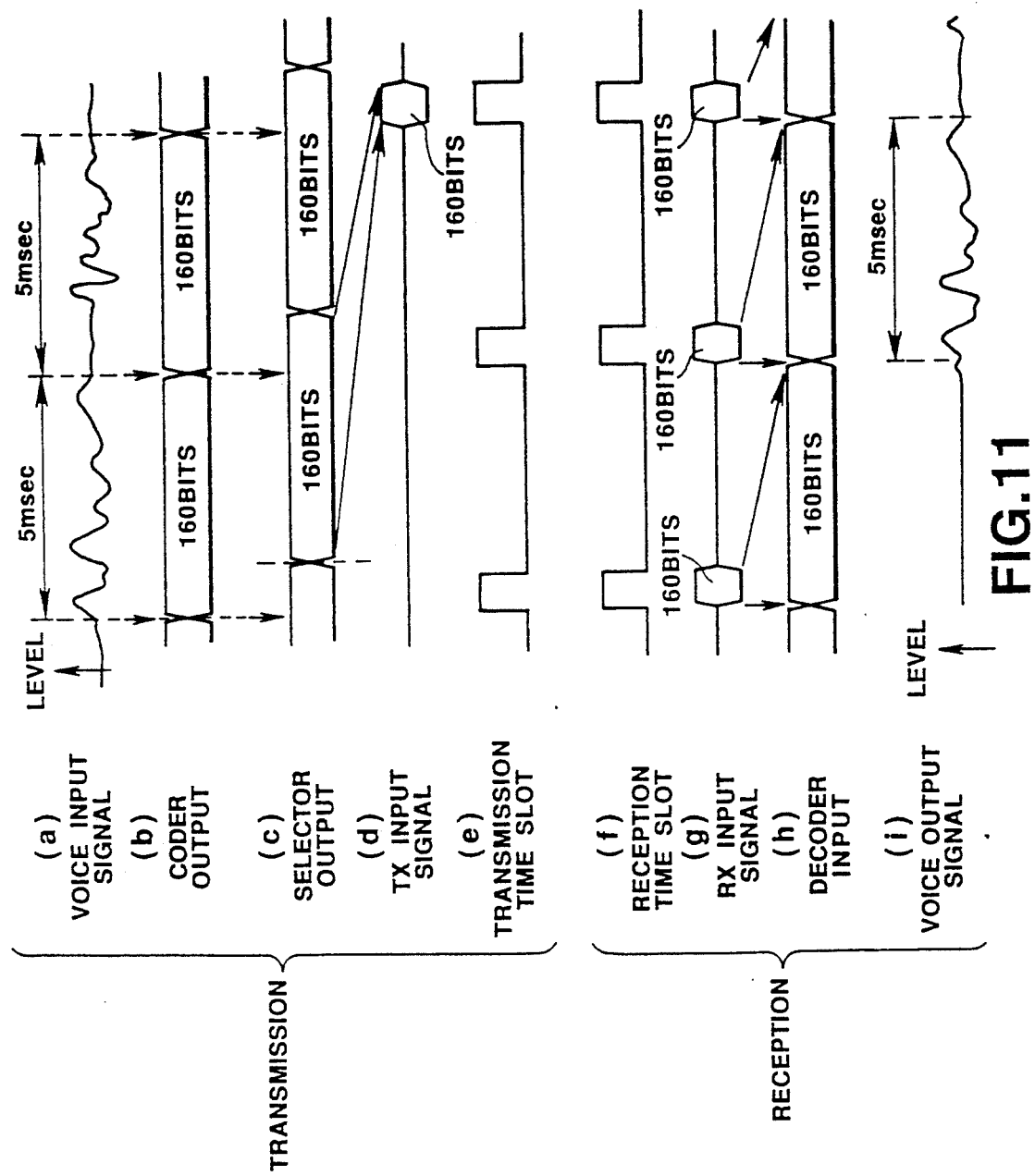
FIG. 11 is a timing chart of waveforms of signals appearing at various points in the radio telephone apparatus of the present invention in a transmission mode.

Explanation will then be made as to the transmitting and receiving operation of the radio telephone apparatus when the transmission frame from the mobile station 40 to the base station 30 is fixed by the system (to be, for example, 5 msec), by referring to the timing chart of FIG. 11.

The timing chart of this example corresponds to the operations when a buffer, as the transmission buffer 408b of the mobile station 40, having the configuration as shown in FIG. 4 is employed.

First, in the mobile station 40, a voice issued from an operator is converted at a microphone 406 into a voice signal (FIG. 11(a)), digitalized at an analog-to-digital (A-D) converter 407, and then applied to a radio transmission section 408.

In the radio transmission section 408, a digital voice signal received from the A-D converter 407 is subjected at a digital encoding circuit (CODER) 408a to a compressing and encoding operation to obtain an encoded output (FIG. 11(b)). The encoded output is temporarily saved in a transmitting buffer 408b. In the illustrated embodiment, the transmitting buffer 408b, which comprises a shift register having a storage capacity of storing voice data corresponding to a transmission time slot (5 msec) (refer to FIG. 4), performs such FIFO operation as to sequentially discard the old data exceeding the above capacity when new data is input to thereby always update and hold a new signal.

The digital voice signal received from the A-D converter 407 is also applied to a voice/voiceless detector 412. The detector 412 monitors the level of the input signal, discriminatingly detects voice and voiceless parts in the digital voice signal, and stops supply of power from a battery 416 to a transmission circuit 408d for a period of time between the detection of the end point of the voice part and the detection of the start point of the next voice part, thus realizing battery saving.

When the detector 412 detects the voice start point of the voice part, the detector 412 also informs a transmission control circuit 411c of a control circuit 411 of its detection result. The transmission control circuit 411c, when receiving the start point detection result from the detector 412, controls a selector output (FIG. 11(c)) of the transmitting buffer 408b in such a manner that the buffer 408b outputs the voice data signal accumulated in the buffer 408b, starting from the voice data including the part preceding the start point detection point of the voice part.

A signal processor 408c receives the voice data from the transmitting buffer 408b, converts the voice data with respect to its transmission rate to obtain a burst signal (FIG. 11(d)). The transmission circuit 408d receives the rate-converted voice data or burst signal from the signal processor 408c and transmits the burst signal at intervals of a transmission time slot (FIG. 11(e)) from an antenna 409 toward the base station 30 via a radio link.

Meanwhile, when a signal transmitted from a party mobile station through such transmitting operation as mentioned above is received at the mobile station 40 via the base station 30, the mobile station 40 receives the signal from an antenna 401 and then applies it to a radio reception section 402.

At this time, the radio reception section 402 receives the received signal (FIG. 11(c)) at a reception circuit 402a at intervals of a reception time slot (FIG. 11(f)) corresponding to the transmission time slot of the party mobile station, and converts the received signal with respect to its frequency into an intermediate frequency signal.

A signal processor 402b receives the intermediate frequency signal from the reception circuit 402a, separates the received data of the intermediate frequency signal into voice data and control data, and supplies the control data to the control circuit 411 and supplies the voice data to a digital decoding circuit 402d through a receiving buffer 402c.

The digital decoding circuit 402d performs its predetermined digital decoding operation over the voice data (FIG. 11(h)) received from the receiving buffer 402c to reproduce it into a digital voice signal, and outputs the digital voice signal. The reproduced digital voice signal is sent through an adder 403 to a digital-to-analog (D-A) converter 404 where the digital voice signal is converted into its original analog signal (FIG. 11(i)) and then output from a loudspeaker 405.

In the signal receiving operation, a noise controller 411b of the control circuit 411 distinguishes a voice part from a voiceless part in the received voice signal on the basis of an analysis result of the above control data by a precaution data detector 411a, and controls a noise generation circuit 413 to generate random noise for a voiceless duration including both a predetermined period immediately before the end of the voice part and a predetermined period immediately after the start of the next voice part. The precaution data detector 411a also controls a level shifter 414 to change the level of the random level signal received from the noise generation circuit 413.

As has been explained in the foregoing, in accordance with the radio telephone apparatus of the present invention, the voice signal is applied to the transmitting buffer 408b even during a voiceless period to sequentially update the transmitting buffer 408b with new voice data, so that, when the system detects a voice part, the system stops the updating operation of the transmitting buffer 408b and transmits through the signal processor 408c and transmission circuit 408d toward the party side mobile station the contents of the transmitting buffer 408b sequentially from the data preceding the voice detection point. According to this method, when the output timing of the voice data stored in the transmitting buffer 408b is suitably controllably set, the transmission of the voice part of the voice data preceding the above voice detection point can be easily controlled.

In this way, the party side mobile station can obtain demodulated voice data without missing of the voice data preceding the voice detection point on the basis of the data received from the above transmission side mobile station. Therefore, when the party side mobile station reproduces the voice data, the station can realize natural speech communication without its head part truncation.

Although the signal transmitting and receiving operation of the foregoing embodiment (refer to FIG. 11) has been explained in connection with the case where the transmission timing of the voice signal is fixed at 5 msec and the transmission rate is set to be 160 bits, the transmission timing and the transmission rate may be modified in various ways depending on systems or signal coding methods.

What is claimed is:

1. A voice communication apparatus in a radio communication system for transmitting a voice signal over a radio link, comprising:
analog-to-digital (A-D) converting means for converting an input voice signal into a digital signal;
encoding means for encoding the digital signal output from said A-D converting means;
a transmitting buffer for temporarily storing voice signal data encoded by said encoding means in a time series manner;
signal processing means for converting output data of said transmitting buffer with respect to its transmission rate to generate a burst signal;
transmitting means for transmitting an output signal of said signal processing means over the radio link;
detecting means for detecting voice and voiceless parts in said input voice signal on the basis of the output data of said A-D converting means; and
transmission control means for stopping output of the voice signal data from said transmitting buffer in response to detection of the voiceless part by said detecting means and, in response to detection of the voice part by said detecting means, for starting output of the voice signal data from said transmitting buffer in a time series manner sequentially from a voice-start-point of the voice part preceding a detected point of the voice part.

2. A voice communication apparatus as set forth in claim 1, wherein said voice-start-point of the voice part is previously set for respective apparatus as a point which is calculated on the basis of said detected point of the voice part.

3. A voice communication apparatus as set forth in one of claims 1 and 2, wherein said transmitting means is rendered inoperative in response to a detection result of the detecting means during a time period from a time when the voiceless part is detected until a time when the voice part is detected.

4. A voice communication apparatus as set forth in claim 1, wherein said transmitting buffer has a first-in first-out (FIFO) processing function of holding therein latest voice signal data within a predetermined storage capacity of said transmitting buffer while discarding a part of the voice signal data exceeding said storage capacity in the order from oldest ones of the received voice signal data.

5. A voice communication apparatus as set forth in claim 4, wherein said transmitting buffer includes a shift register having a predetermined number of stages for sequentially shifting the input voice signal data and a selector for selectively outputting said voice signal data from and one of said stages of said shift register, said transmitting buffer, in accordance with switching control of said transmission control means over output stages of said selector, starts the output from voice signal data including said voice-start-point of the voice part.

6. A voice communication apparatus as set forth in claim 5, wherein said transmitting buffer further includes transmission rate converting means for converting a signal of the voice signal data output through said selector into a high transmission-rate signal.

7. A voice communication apparatus as set forth in claim 1, wherein transmission frame of the signal transmitted by said transmitting means over the radio link is fixed to be a constant time.

8. A voice communication apparatus as set forth in claim 1, wherein said transmitting buffer has a capacity for storing therein the voice signal data corresponding to at least one transmission frame.

9. A voice communication apparatus as set forth in claim 1, wherein said encoding means comprises an encoding circuit of an adaptive differential pulse code modulation (ADPCM) system.

10. A voice communication system using a voice communication apparatus for transmitting a voice signal over a radio link, comprising:
  a transmitting buffer for temporarily storing in a time series manner voice signal data obtained by encoding a digital voice signal converted from an input voice signal;
  detecting means for detecting voice and voiceless parts in said input voice signal on the basis of the digital voice signal converted from the input voice signal; and
  transmission control means, in response to detection of a voice part by said detecting means, for controlling said transmitting buffer to output said voice signal data in a time series manner sequentially from a voice-start-point of the voice part preceding a detected point of the voice part,
  wherein said transmitting means is rendered inoperative after said detecting means detects a voiceless part and, in response to the detection of the voice part by said detecting means, said transmitting means is rendered operative.

11. A voice communication system as set forth in claim 10, wherein said voice-start-point of the voice part is previously set for respective apparatus as a point which is calculated on the basis of said detected point of the voice part.

12. A voice communication apparatus as set forth in claim 10, wherein said transmitting buffer has a first-in first-out (FIFO) processing function of holding therein latest voice signal data within a predetermined storage capacity of the transmitting buffer while discarding part of the voice signal data exceeding said storage capacity in the order from oldest ones of the received voice signal data.

13. A voice communication apparatus as set forth in claim 12, wherein said transmitting buffer includes a shift register having a predetermined number of stages for sequentially shifting said input voice signal data and a selector for selectively outputting said voice signal data from any one of said stages of said shift register, said transmitting buffer, in accordance with switching control of said transmission control means over output stages of said selector, starts the output from voice signal data including the voice-start-point of the voice part.

14. A voice communication apparatus as set forth in claim 13, wherein said transmitting buffer further includes transmission rate converting means for converting a signal of the voice signal data output through said selector into a high transmission-rate signal.

15. A voice communication apparatus as set forth in claim 10, wherein a transmission frame of the signal transmitted by said transmitting means over the radio link is fixed to be a constant time.

16. A voice communication apparatus as set forth in claim 15, wherein said transmitting buffer has a capacity for storing therein the voice signal data corresponding to at least one transmission frame.

17. A voice communication apparatus as set forth in claim 10, wherein said encoding means comprises an encoding circuit of an adaptive differential pulse code modulation (ADPCM) system.

18. A radio telephone apparatus used in a radio communication system for transmitting a voice signal to a base station over a radio link, comprising:
  analog-to-digital (A-D) converting means for converting an input voice signal to a digital signal;
  encoding means for encoding the digital signal output from said A-D converting means;
  a transmitting buffer for temporarily storing voice signal data encoded by said encoding means in a time series manner;
  signal processing means for converting output data of said transmitting buffer with respect to its transmission rate to generate a burst signal;
  transmitting means for transmitting an output signal of said signal processing means over the radio link;
  detecting means for detecting voice and voiceless parts in said input voice signal on the basis of the output data of said A-D converting means; and
  transmission control means for stopping output of the voice signal data from said transmitting buffer in response to detection of the voiceless part by said detecting means and, in response to detection of the voice part by said detecting means, for starting output of the voice signal data from said transmitting buffer in a time series manner sequentially from a voice-start-point of the voice part preceding a detected point of the voice part.

19. A voice communication apparatus as set forth in claim 18, wherein said voice-start-point of the voice part is previously set for respective apparatus as a point which is calculated on the basis of said detected point of the voice part.

20. A voice communication apparatus as set forth in one of claims 18 and 19, wherein said transmitting means is rendered inoperative in response to a detection result of the detecting means during a time period from a time when the voiceless part is detected until a time when the voice part is detected.

21. A voice communication apparatus as set forth in claim 18, wherein said transmitting buffer has a first-in first-out (FIFO) processing function of holding therein latest voice signal data within a predetermined storage capacity of the transmitting buffer while discarding part of the voice signal data exceeding said storage capacity in the order from oldest ones of the received voice signal data.

22. A voice communication apparatus as set forth in claim 21, wherein said transmitting buffer includes a shift register having a predetermined number of stages for sequentially shifting the input voice signal data and a selector for selectively outputting said voice signal data from any one of said stages of said shift register, said transmitting buffer, in accordance with switching control of said transmission control means over output stages of said selector, starts the output from voice signal data including said voice-start-point of the voice part.

23. A voice communication apparatus as set forth in claim 22, wherein said transmitting buffer further includes transmission rate converting means for converting a signal of the voice signal data output through said selector into a high transmission-rate signal.

24. A voice communication apparatus as set forth in claim 18, wherein transmission frame of the signal transmitted by said transmitting means over the radio link is fixed to be a constant time.

25. A voice communication apparatus as set forth in claim 24, wherein said transmitting buffer has a capacity for storing therein the voice signal data corresponding to at least one transmission frame.

26. A voice communication apparatus as set forth in claim 18, wherein said encoding means comprises an encoding circuit of an adaptive differential pulse code modulation (ADPCM) system.

27. A radio telephone apparatus used in a radio communication system for transmitting a voice signal to a base station over a radio link, comprising:
analog-to-digital (A-D) converting means for converting an input voice signal to a digital signal;
encoding means for encoding the digital signal output from said A-D converting means;
a transmitting buffer for temporarily storing voice signal data encoded by said encoding means in a time series manner;
signal processing means for converting output data of said transmitting buffer with respect to its transmission rate to generate a burst signal;
transmitting means for transmitting an output signal of said signal processing means over the radio link;
detecting means for detecting voice and voiceless parts in said input voice signal on the basis of the output data of said A-D converting means; and
transmission control means for stopping the data output of the voice signal data from said transmitting buffer in response to detection of the voiceless part by said detecting means and, in response to detection of the voice part by said detecting means, for starting output of the voice signal data from said transmitting buffer in a time series manner sequentially from a voice-start-point of the voice part preceding a detected point of the voice part;
receiving means for receiving a signal transmitted over the radio link;
decoding means for decoding a voice part included in the signal received by said receiving means into voice data signal on the basis of control data included in the signal received by said receiving means;
digital-to-analog (D-A) converting means for converting output data of said decoding means into an analog signal; and
reproducing means for reproducing a reception voice from an output signal of said D-A converting means.

28. A radio telephone apparatus as set forth in claim 27, further comprising:
noise generating means for generating a random noise;
a level shifter for shifting level of said random noise;
adding means for adding an output of said level shifter to an output of said decoding means;
data detecting means for detecting transmission start data and transmission stop warning data contained in said control data; and
noise control means for distinguishing a voice part from a voiceless part in said received signal on the basis of a detection result of said data detecting means, for inserting said random noise signal of said noise generating means into said received signal in a voiceless duration period including both a predetermined period immediately before end of the voice part and a predetermined period immediately after start of the next voice part, and for changing the level of said random noise through said level shifter.

29. A voice communication apparatus in a radio communication system for transmitting a voice signal to a base station over a radio link, comprising:
storing means for temporarily storing voice signal data corresponding to an input voice signal;
transmitting means for transmitting the voice signal data stored in the storing means over the radio link;
detecting means for detecting a point of a voice part of the voice signal data; and
transmission control means for controlling the transmitting means to transmit the voice signal data including a voice-start-point of the voice part preceding the point detected by the detecting means in response to that the detecting means detects the point of the voice part of the voice signal data after a certain period when the detecting means has not detected any points of the voice part of the voice signal data.

* * * * *

UNITED STATES PATENT AND TRADEMARK OFFICE
CERTIFICATE OF CORRECTION

PATENT NO. : 5,327,461
DATED : July 05, 1994
INVENTOR(S) : Naohide KUSHIGE et al.

It is certified that error appears in the above-indentified patent and that said Letters Patent is hereby corrected as shown below:

Claim 5, Column 15, Line 14, change "and" to --any--.

Signed and Sealed this

Twenty-eight Day of March, 1995

Attest:

BRUCE LEHMAN

*Attesting Officer*  *Commissioner of Patents and Trademarks*